(12) United States Patent
Izukawa

(10) Patent No.: US 9,002,193 B2
(45) Date of Patent: Apr. 7, 2015

(54) CAMERA, LENS UNIT, AND IMAGE-PICKUP SYSTEM

(71) Applicant: Canon Kabushiki Kaisha, Tokyo (JP)

(72) Inventor: Kazuhiro Izukawa, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 14/248,789

(22) Filed: Apr. 9, 2014

(65) Prior Publication Data

US 2014/0300770 A1 Oct. 9, 2014

(30) Foreign Application Priority Data

Apr. 9, 2013 (JP) .................................. 2013-081497

(51) Int. Cl.
*G03B 17/00* (2006.01)
*H04N 5/232* (2006.01)

(52) U.S. Cl.
CPC ................. *H04N 5/23241* (2013.01)

(58) Field of Classification Search
CPC ........................ G03B 2206/00; H04N 1/0083
See application file for complete search history.

(56) References Cited

U.S. PATENT DOCUMENTS 8,374,499 B2* 2/2013 Sakamoto ...................... 396/532
2014/0022418 A1* 1/2014 Kano .............................. 348/241

FOREIGN PATENT DOCUMENTS

| JP | 07-203116 A | 8/1995 |
| JP | 08-129199 A | 5/1996 |

* cited by examiner

*Primary Examiner* — Clayton E Laballe
*Assistant Examiner* — Noam Reisner
(74) *Attorney, Agent, or Firm* — Rossi, Kimms & McDowell LLP

(57) ABSTRACT

A camera communication unit is configured to change a voltage applied to a communication terminal used for a communication with the lens unit. The camera communication unit is configured to communicate with the lens unit using one of a first communication mode and a second communication mode, the first communication mode setting the voltage applied to the communication terminal to a first range and enabling the communication with the lens unit using a communication method of a first communication speed, and the second communication mode setting the voltage applied to the communication terminal to a second range that is located on a lower voltage side than the first range and enabling the communication with the lens unit using a communication method of a second communication speed higher than the first communication speed.

16 Claims, 5 Drawing Sheets

CAMERA, LENS UNIT, AND IMAGE-PICKUP SYSTEM

BACKGROUND OF THE INVENTION

1. Field of the Invention

The present invention relates to an interchangeable lens (lens unit), a camera to which the interchangeable lens is attachable and from which the interchangeable lens is detachable, and an image-pickup system that includes the interchangeable lens and the camera.

2. Description of the Related Art

Japanese Patent Laid-Open No. ("JP") 8-129199 proposes an image-pickup system configured to set a high communication speed or communication clock frequency between the camera and the interchangeable lens after it is confirmed that the interchangeable lens is compatible with that speed. JP 7-203116 proposes a radio facsimile machine configured to set a low communication speed when the received voltage level is low and a high communication speed when the received voltage level is high.

The method disclosed in JP 8-129199 sets a high communication speed while maintaining the voltages of the communication terminals of the interchangeable lens and the camera, and the method disclosed in JP 7-203116 sets a high communication speed when the received voltage level is high. Therefore, the number of charges/discharges increases in the communication terminals and a power consumption and a radiation noise increase.

SUMMARY OF THE INVENTION

The present invention provides a camera, lens unit, and image-pickup system that can save the power consumption while increasing the communication speed.

A camera to which a lens unit is attachable and from which the lens unit is detachable includes a camera communication unit configured to communicate with the lens unit, and a camera controller configured to control the camera communication unit. The camera communication unit is configured to change a voltage applied to a communication terminal used for a communication with the lens unit. The camera communication unit is configured to communicate with the lens unit using one of a first communication mode and a second communication mode. The first communication mode sets the voltage applied to the communication terminal to a first range, and enables the communication with the lens unit using a communication method of a first communication speed. The second communication mode sets the voltage applied to the communication terminal to a second range that is located on a lower voltage side than the first range, and enables the communication with the lens unit using a communication method of a second communication speed higher than the first communication speed.

Further features of the present invention will become apparent from the following description of exemplary embodiments with reference to the attached drawings.

DESCRIPTION OF THE EMBODIMENTS

Figure 1:
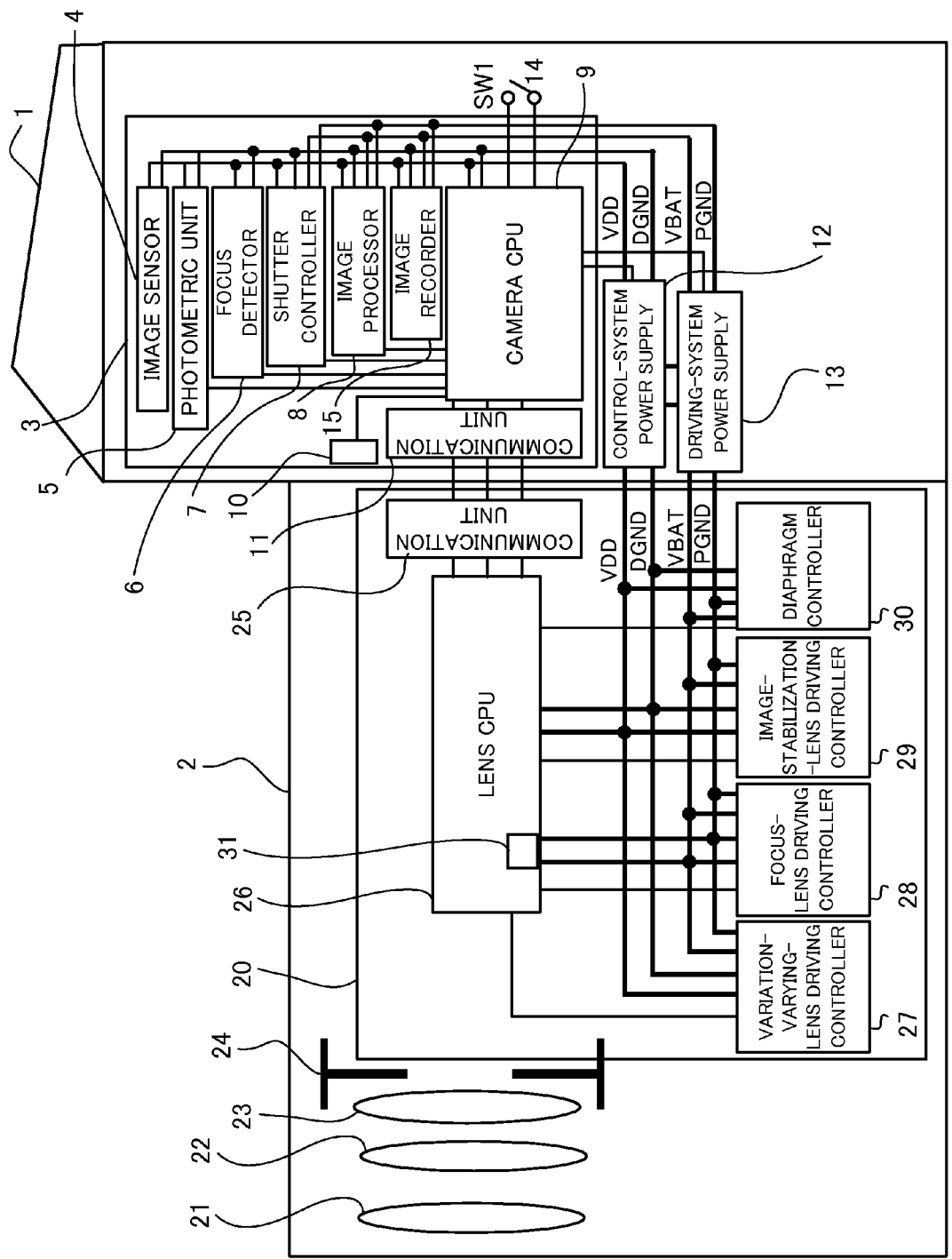
FIG. 1 is a block diagram of an image-pickup system according to first and second embodiments of the present invention.

FIG. 1 is a block diagram of an image-pickup system (optical apparatus) according to this embodiment. The image-pickup system includes a camera (optical system) 1 and an interchangeable lens (optical apparatus or lens unit) 2. The interchangeable lens 2 is detachably attached to the camera 1. The camera 1 is a camera, such as a single-reflex camera or a mirror-less camera.

The initial communication starts when the interchangeable lens 2 is attached to the camera 1 or the power is turned on. Due to the initial communication, the camera 1 can identify the image-pickup optical system in the interchangeable lens 2. This embodiment transmits aberration correcting information of an image-pickup optical system in the interchangeable lens 2 to the camera 1 in the initial communication. The aberration correcting information that is information on a diffraction characteristic, a drop of a peripheral light amount, a distortion, a chromatic aberration, etc. and depends upon positions or states of a magnification-varying lens, a focus lens, and an extender in the image-pickup optical system. The aberration correcting information of the image-pickup optical system is transmitted from the interchangeable lens to the camera in the initial communication for image processing of reducing or moderating the image deterioration at the camera side. Herein, the aberration correcting information is information necessary for the image processing in the camera. The aberration correcting information may be data itself of a diffraction characteristic, a distortion, a chromatic aberration, etc. of the image-pickup system or may be information relating to a optical transmission function ("OTF") and a modulation transfer function ("MTF"). However, the aberration correcting information has a large data size and takes a long transmission time at a normal initial communication speed. Accordingly, this embodiment devises a way to improve the communication speed of the initial communication.

The camera 1 includes an electric circuit unit 3, a control-system ("control") power supply 12, a driving-system ("driving") power supply 13, and a switch 14. The electric circuit unit 3 includes an image sensor 4, a photometric unit 5, a focus detector 6, a shutter controller 7, an image processor 8, a camera CPU 9, an interchangeable-lens ("lens") attachment detector 10, a communication unit 11, and an image recorder 15.

The image sensor 4 is a photoelectric conversion element configured to photoelectrically convert an optical image formed by the interchangeable lens 2. The photometric unit 5 measures a light amount that has passed the image-pickup optical system in the interchangeable lens 2. The focus detector 6 detects a focus state of an interchangeable lens 2 using a phase difference detection method. The focus detector 6 may utilize another AF sensor different from the image sensor 4 or focus detecting pixels provided on an image pickup plane of the image sensor 4.

The shutter controller 7 controls opening and closing of a shutter (not illustrated) so as to expose the image sensor 4 for a proper time period. The image processor 8 provides appropriate processing, such as developing an output of the image sensor 4. In particular, the image processor 8 of this embodiment corrects an aberration in a captured image based on the aberration correcting information sent in the initial communication and the positional information of the image-pickup optical system.

The camera CPU 9 is a CPU or a microcomputer, and serves as a first controller configured to control each component in the camera 1. For example, the camera CPU 9 controls voltage changes by the voltage changer in the communication unit 11 or a voltage-detection-range changing circuit 41 which will be described later. The camera CPU 9 communicates with the lens CPU 26 in the interchangeable lens 2, and transmits a variety of instructions to the lens CPU 26. These instructions contain an instruction that requires a change of a communication mode, such as a communication speed, a working voltage, and a communication line. More specifically, the camera CPU 9 generates an instruction that requires a reduction of the voltage used for communications when increasing a communication speed.

The lens attachment detector 10 detects an attachment of the interchangeable lens 2 to the camera utilizing a switch, a photodetector, etc. The communication unit 11 is a first communication unit configured to enable the camera CPU 9 to communicate with the lens CPU 26. The details of the structure of the communication unit 11 will be described later, and the communication unit 11 includes a first voltage changer configured to change the working voltage.

The control power supply 12 supplies power to a control system circuit that requires a stable output voltage having a comparatively small power consumption amount for the image sensor 4, the photometric unit 5, the focus detector 6, and the image processor 8. The driving power supply 13 supplies the power to the driving system circuit that requires a comparatively large power consumption amount of the interchangeable lens 2.

The switch 14 turns on when a release button is half-pressed, and transmits a SW1 signal that starts a capture preparation, such as the AF and photometry, to the camera CPU 9. The image recorder 15 may be a nonvolatile memory.

The interchangeable lens 2 includes the image-pickup optical system configured to form an optical image of an object, and an electric circuit unit 20.

The image-pickup optical system includes a magnification-varying lens 21, a focus lens 22, an image stabilization lens 23, a diaphragm 24, and an extender. The magnification-varying lens 21 is moved in the optical direction and changes a focal length. The focus lens 22 is moved in the optical axis direction for focusing. The image stabilization lens is moved in a direction orthogonal to the optical axis and stabilizes an image. The "direction orthogonal to the optical axis" may have a component orthogonal to the optical axis, and the image stabilization lens 23 may be moved obliquely to the optical axis. The diaphragm 24 adjusts a light amount incident upon the image sensor 4 of the camera 1.

The electric circuit unit 20 includes the communication unit 25, the lens CPU 26, a magnification-varying-lens ("zoom") driving controller 27, a focus-lens ("focus") driving controller 28, an image stabilization lens ("IS") driving controller 29, a diaphragm controller 30, and an aberration correcting information storage 31.

The communication unit 25 is a second communication unit that enables the lens CPU 26 to communicate with the camera CPU 9. The details of the structure of the communication unit 25 will be described later, and the communication unit 25 includes the second voltage changer configured to change the working voltage.

The lens CPU 26 is a CPU or microcomputer, and serves as a second controller configured to communicate with the camera CPU 9 and to control each component in the interchangeable lens 2. For example, the lens CPU 26 controls voltage changes of the voltage changer of the communication unit 25 or the voltage changing circuit 49, which will be described later. In addition, in the initial communication, the lens CPU 26 transmits to the camera CPU 9, aberration correcting information of the image-pickup optical system stored in the aberration correcting information storage 31 as well as the normal information, such as a type of the image-pickup optical system. In addition, the lens CPU changes the communication mode, such as the communication speed, the working voltage, and the communication line, in response to the instruction from the camera CPU 9. The aberration correcting information storage 31 stores aberration correcting information that depends upon positions of the magnification-varying lens 21, the focus lens 22, the image stabilization lens 23, and the diaphragm 24.

The zoom driving controller 27 controls driving of the magnification-varying lens 21 in the optical-axis direction. The focus driving controller controls driving of the focus lens 22 in the optical-axis direction. The IS driving controller 29 controls driving of the image stabilization lens 23 in the direction orthogonal to the optical axis. The diaphragm driving controller 30 controls driving of aperture blades.

First Embodiment

Figure 2:
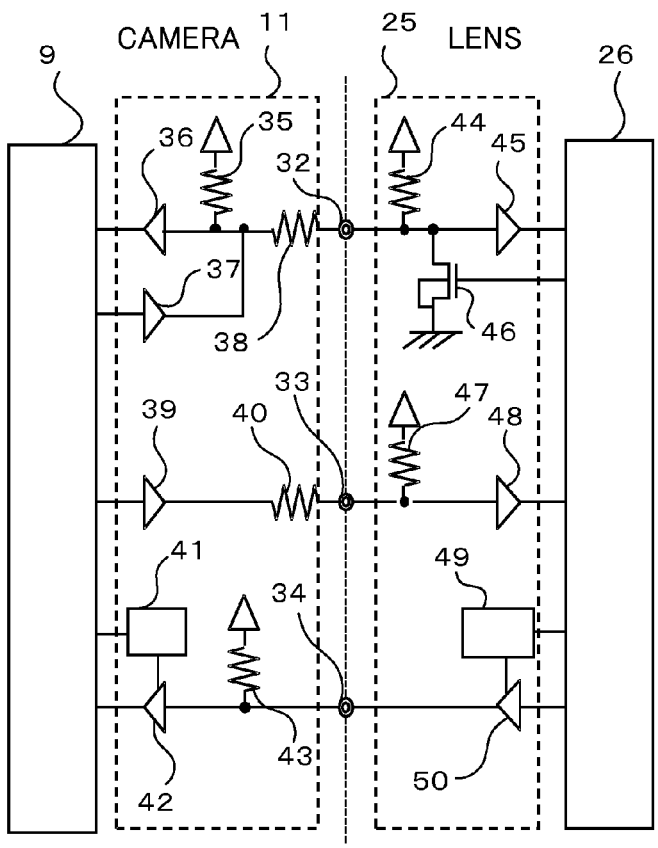
FIG. 2 illustrates a communication unit illustrated in FIG. 1 according to the first embodiment.

FIG. 2 illustrates the CPU 9, the communication unit 11 on the camera side, the communication unit 25 on the interchangeable lens side, and the lens CPU 26 according to the first embodiment. Reference numeral 32 denotes a clock signal terminal CLK, reference numeral 33 denotes a data transmission terminal DCL from the camera 1 to the interchangeable lens 2, and reference numeral 34 denotes a data communication terminal DLC from the interchangeable lens 2 to the camera 1.

Reference numeral 35 denotes a pull-up resistor configured to stabilize the communication terminal voltage when the output circuit opens. Reference numeral 36 denotes an input circuit configured to detect whether an FET 46 turns on or off while the output circuit 37 opens the output for a predetermined time period. Reference numerals 38 and 40 are current limiting resistors configured to limit the current so as to prevent the output circuit from destroying when the output circuit contacts the power supply terminal or ground terminal by mistake. Reference numeral 39 is an output circuit configured to transmit information from the camera 1 to the interchangeable lens 2.

Reference numeral 41 is a voltage-detecting-range changing circuit configured to change an input voltage detecting range of the input circuit 42 in accordance with the signal from the camera CPU 9, and to vary the voltage used for the communication. When the communication terminal voltage is decreased, the input voltage detecting range is set suitable for the detection using that voltage. The voltage detecting range changing circuit 41 manages the central voltage of 2.5V and a range from the central voltage (±2.5V) when the working voltage is 5V, and the central voltage of 1.5V and a range from the central voltage (±1.5V) when the working voltage is 3V.

Reference numerals 43 and 44 denote pull-up resistors. Reference numeral 45 denotes an input circuit configured to receive a clock signal from the output circuit 37. Reference numeral 46 denotes an FET used to inform the camera CPU 9 of various states from the lens CPU 26 while the output circuit 37 opens the output. Reference numeral 47 denotes a pull-up resistor, and reference numeral 48 denotes an input circuit.

Reference numeral 49 denotes a voltage changing circuit configured to change the output voltage of the output circuit 50 in accordance with the signal from the lens CPU 26, and serves as a voltage changer configured to change the voltage used for the communication.

Figure 3:
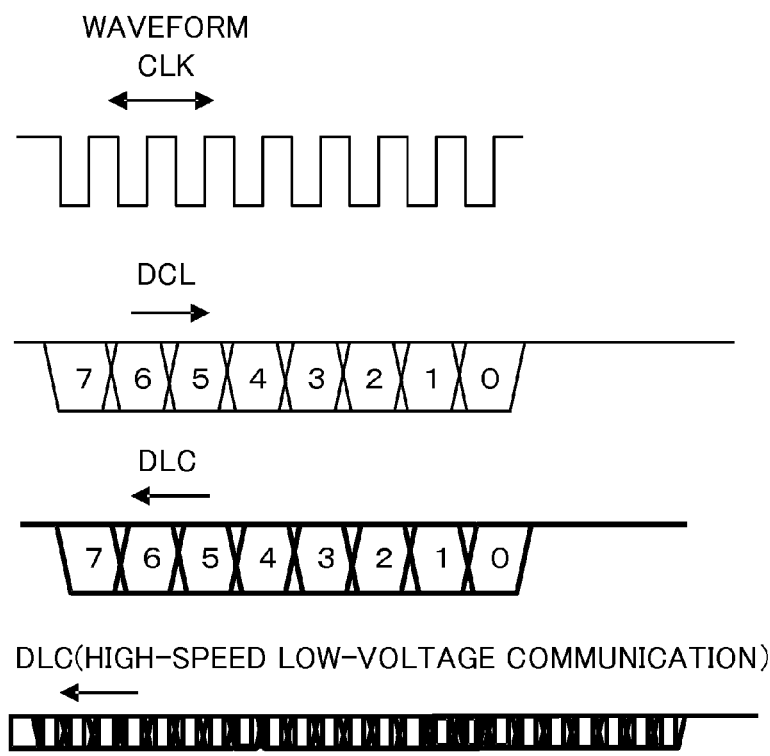
FIG. 3 illustrates signal waveforms of a terminal illustrated in FIG. 2 according to the first embodiment.

FIG. 3 is a signal waveform chart of the clock signal terminal CLK 32, the data transmission terminal DCL 33, and the data communication terminal DLC 34 according to the first embodiment.

In the initial communication, a three-wire synchronous communication is performed with the data transmission terminal DCL 33 and the data communication terminal DLC 34 in synchronization with the CLK signal (clock) that flows in the clock signal terminal CLK 32. In this state, the communication speed from the interchangeable lens 2 to the camera 1 via the data communication terminal DLC 34 is a first communication speed (first clock frequency in synchronization with the CLK signal) and the first voltage is applied to the data communication terminal DLC 34.

Next, the communication mode is changed to the high-speed low-voltage communication in the initial communication. Then, the CLK signal that flows in the clock signal terminal CLK 32 is the same as the DCL signal that flows in the data transmission terminal DCL 33, but the communication mode via the data communication terminal DLC 34 is changed to set the second communication speed and the second voltage. The second communication speed is higher than the first communication speed, and the second voltage is lower than the first voltage.

The communication via the data transmission terminal DLC 34 is asynchronous with the CLK signal, and the clock frequency is fast for the low-voltage communication. This configuration can transmit a large amount of aberration correcting information (several megabytes) at a high speed from the interchangeable lens 2 to the camera 1 and shorten the initial communication time period. For example, the communication time period is 8 seconds for the aberration correcting information of 1 Mbyte and the clock frequency of the CLK signal of 1 MHz even when starting and ending data of the communication and an increase amount for redundancy of the asynchronous communication are removed. Since this time period affects the snapshot of the camera, the communication time period is reduced down to 80 ms by setting the DLC communication clock to 100 MHz so as to increase the communication speed.

The power consumption and the radiation noises can be reduced by lowering the voltage, for example, from 5V to 3V. Since this embodiment is subject to the incoming noises when the communication terminal voltage is dropped, the wiring arrangement is adjusted and the shield member is provided on the lens barrel.

Figure 4:
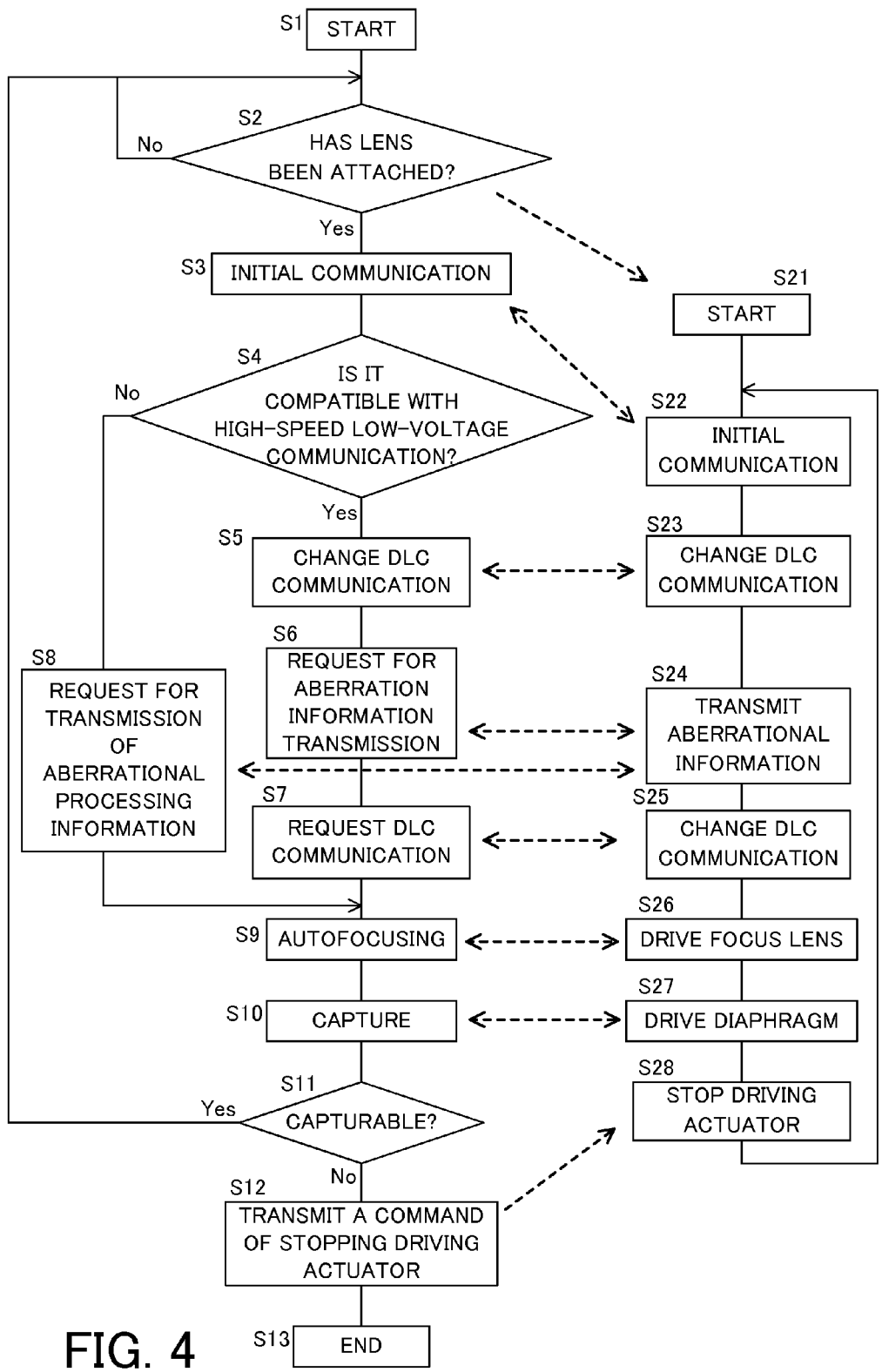
FIG. 4 is a flowchart of an operation of the image-pickup system illustrated in FIG. 1 according to the first embodiment.

FIG. 4 is a flowchart of the image-pickup system, and "S" stands for the step. The flowchart illustrated in FIG. 4 can be implemented as a program that enables a computer to realize a function of each step. S1 to S13 represent an operation of the camera 1 (camera CPU 9), and S21 to S28 represent an operation of the interchangeable lens 2 (lens CPU 26).

The camera CPU 9 starts an operation of the camera 1 (S1), and supplies power to the interchangeable lens 2 via the control power supply 12 and the driving power supply 13 when detecting an attachment of the interchangeable lens 2 based on the output of the lens attachment detector 10 (Yes of S2). Thereby, the lens CPU 26 starts an operation of the interchangeable lens 2 (S21).

The camera CPU 9 starts an initial communication with the lens CPU 26 using a first communication speed and a first voltage (S4 and S22), and instructs the lens CPU 26 to transmit information (first data) relating to corresponding information of the communication method, a type, a focal length, a position of each lens, and aberration correcting information, etc. of the image-pickup optical system. In addition, the camera CPU 9 transmits a driving instruction to each actuator to the lens CPU 26. The lens CPU 26 transmits necessary information to the camera CPU 9.

Next, the camera CPU 9 determines whether the interchangeable lens 2 is compatible with the high-speed low-voltage communication, based upon the corresponding information of the communication mode received in S3 (S4). When the lens CPU 26 is compatible with the high-speed low-voltage communication (Yes of S4), the camera CPU 9 requires the lens CPU 26 to change the communication (S5, S23). In addition, the camera CPU 9 changes setting of the voltage-detection-range changing circuit 41 of the communication unit 11 so as to set the communication clock of the data communication terminal DLC 34 to 100 MHz and the voltage detecting range to 3V. The lens CPU 26 sets the voltage changing circuit 49 so as to set the frequency of the DLC signal to 100 MHz and the voltage detecting range to 3V.

Next, the camera CPU 9 requires the lens CPU 26 to transmit aberration correcting information (S6). The lens CPU 26 transmits the aberration correcting information of the aberration correcting information storage 31 using a communication mode that utilizes a second communication speed faster than the first communication speed and a second voltage lower than the first voltage (S24). The aberration correcting information is second data, and the second data size is larger than the first data size. This communication is an asynchronous communication because it has a frequency different from the clock frequency of the clock signal terminal CLK 32. The asynchronous communication can use a communication method, such as an 8b/10b communication and an NRZ communication. In addition, at the start and end of the communication, data representing the start or end of the communication and an error correcting code are transmitted. At the switching time, a different voltage signal is received and a sufficiently free time period is set.

When the reception of the aberration correcting information is completed, the camera CPU 9 requires the lens CPU 26 to return to the original DLC communication mode (S8, S25), and changes the setting of the communication unit 11 to the original state. More specifically, the camera CPU 9 changes setting of the voltage detection range changing circuit 41 so as to reset the communication clock of the data communication terminal DLC 34 to 1 MHz and the voltage detection range to 5V. The lens CPU 26 sets the voltage changing circuit 49 so as to conform to the communication clock of 1 MHz and the voltage detection range of 5V. A different voltage is received at the switching time, and a sufficiently free time period is set. As a result, the DLC communication employs a first communication speed and a first voltage.

On the other hand, when the lens CPU 26 is not compatible with the high-speed low-voltage communication (No of S4), the camera CPU 9 requires the lens CPU 26 to transmit the aberration correcting information in accordance with the communication mode that utilizes the first communication and the first voltage, and the lens CPU 26 transmits the aberration correcting information in accordance with that communication mode (S8, S24).

After S7 or S8, when the switch 14 turns on, the camera 9 determines the driving direction and the driving speed of the focus lens 22 based on the information received in the initial communication (S4) and the output of the focus detector 6, and transmits it to the lens CPU 26 (S9). The lens CPU 26 receives the focus lens driving instruction and drives the focus lens 22 via the focus driving controller 28 (S26).

Next, the camera CPU 9 controls the shutter controller 7 and the diaphragm 24 based on the output of the photometric unit 5, exposes the image sensor 4, and captures an image (S10, S27). Next, the image processor 8 processes the image taken by the image sensor 4, using the aberration correcting information received from the lens CPU 26 in S7 or S8, and records the resultant image in the image recorder 15.

When the image recorder 15 has a storage capacity and power supply margin enough to continue the image pickup (Yes of S11), the flow returns to S2. When the image pickup is to end (No of S11), the actuator driving stop instruction is transmitted to the lens CPU 26 (S12) and ends the processing (S13). In response, the lens CPU 26 stops driving the actuator (S28).

Second Embodiment

Figure 5:
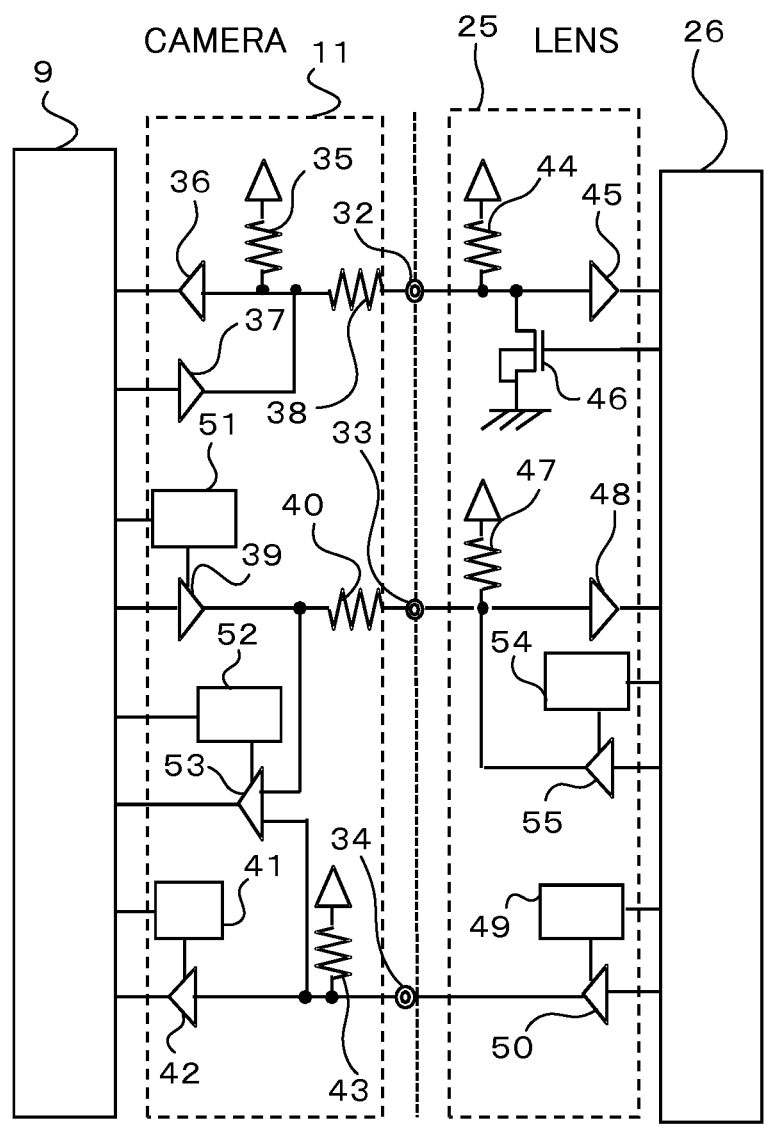
FIG. 5 illustrates a communication unit illustrated in FIG. 1 according to the second embodiment.
Figure 6:
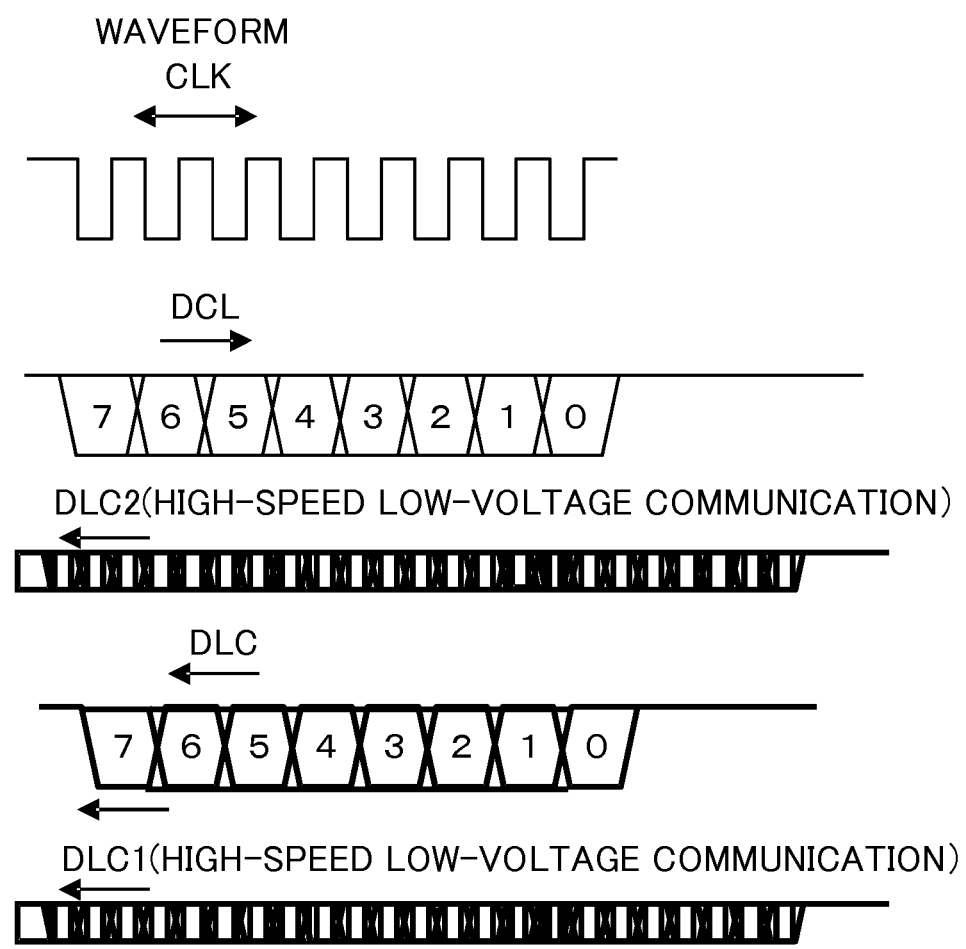
FIG. 6 illustrates signal waveforms of a terminal illustrated in FIG. 5 according to the second embodiment.

FIG. 5 illustrates the camera CPU 9, the communication unit 11 on the camera side, the communication unit 25 on the interchangeable unit side, and the lens CPU 26 according to a second embodiment. Those elements in FIG. 5, which are corresponding elements in FIG. 2, are designated by the same reference numerals. Reference numeral 51 denotes an output-circuit switching circuit that opens the output of the output circuit 39. Reference numeral 52 denotes an input-voltage switching circuit, and reference numeral 53 denotes a differential input circuit. Reference numeral 54 is an output-circuit switching circuit, and reference numeral 55 denotes an output circuit. FIG. 6 is a signal waveform chart of the clock signal terminal CLK 32, the data transmission terminal DCL 33, and the data communication terminal DLC 34 according to the second embodiment.

In the initial communication, the three-wire synchronous communication is performed between the data transmission terminal DCL 33 and the data communication terminal DLC 34 in synchronization with the clock signal (clock) that flows in the clock signal terminal CLK 32. In this state, the communication speed via the data communication terminal DLC 34 from the interchangeable lens 2 to the camera 1 is the first communication speed, and the voltage applied to the data communication terminal DLC 34 is the first voltage.

Next, the communication method is turned to the high-speed low-voltage communication in the initial communication. Although the CLK signal that flows in the clock signal terminal CLK 32 is the same as the DCL signal from the camera 1 to the interchangeable lens 2 which flows in the data transmission terminal DCL 33, the communication mode via the data communication terminal DLC 34 is switched to the differential communication mode. In the differential communication mode, the DLC signal flows from the interchangeable lens 2 to the camera 1 both through the communications terminals, such as the data transmission terminal DCL 33 and the data communication terminal DLC 34.

In FIG. 6, DLC1 represents a DLC signal flowing in the data communication terminal DLC 34, and DLC2 represents a DLC signal flowing in the data transmission terminal DCL 33. The lens CPU 26 switches the communication direction to the opposite direction when transmitting the DLC2 signal. It is similar to the first embodiment that the communication modes of DLC1 and DLC2 use the second communication speed and the second voltage and are asynchronous with the CLK signal. The transmission of the differential signal can reduce the radiation noises.

Since the data transmission terminal DCL 33 receives the DLC2 signal in the high-speed low-voltage communication, the output-circuit switching circuit 51 opens the output of the output circuit 39. In addition, the output-circuit switching circuit 54 in the communication unit 25 opens the output of the output circuit 55 in the initial communication.

While this embodiment changes the communication mode of the communication terminal for the DLC signal, the communication mode of the communication terminal for the DCL signal may be changed when the data size transmitted from the camera 1 to the interchangeable lens 2 is large.

The present invention can provide a camera, lens unit, and image-pickup system that can restrain the power consumption while increasing the communication speed.

The present invention is applicable to an interchangeable lens, a camera to which the interchangeable lens is attachable, and an image-pickup system that includes the interchangeable lens and the camera.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-081497, filed Apr. 9, 2013 which is hereby incorporated by reference herein in its entirety.

What is claimed is:

1. A camera to which a lens unit is attachable and from which the lens unit is detachable, the camera comprising:
   a camera communication unit configured to communicate with the lens unit; and
   a camera controller configured to control the camera communication unit,
   wherein the camera communication unit is configured to change a voltage applied to a communication terminal used for a communication with the lens unit, and
   wherein the camera communication unit is configured to communicate with the lens unit using one of a first communication mode and a second communication mode, the first communication mode setting the voltage applied to the communication terminal to a first range and enabling the communication with the lens unit using a communication method of a first communication speed, and the second communication mode setting the voltage applied to the communication terminal to a second range that is located on a lower voltage side than the first range and enabling the communication with the lens unit using a communication method of a second communication speed higher than the first communication speed.

2. The camera according to claim 1, wherein data size communicated in the second communication mode is larger than data size communicated in the first communication mode.

3. The camera according to claim 1, wherein the camera communication unit communicates with the lens unit using the second communication mode in an initial communication between the lens unit and the camera.

4. The camera according to claim 1, wherein the communication is performed in synchronization with a clock signal in the first communication mode, and the communication is performed asynchronously with the clock signal in the second communication mode.

5. The camera according to claim 1, wherein the communication terminal is a communication terminal that is used for the camera to receive data from the lens unit.

6. The camera according to claim 1, wherein the lens unit includes an image-pickup optical system configured to form an optical image of an object, and data communicated in the second communication mode contains aberration correcting information of the image-pickup optical system, and
wherein the camera further includes an image sensor configured to photoelectrically convert the optical image formed by the image-pickup optical system and an image processor configured to process an output from the image sensor based upon the aberration correcting information.

7. The camera according to claim 1, wherein the camera communication unit executes a communication of the second communication mode using a differential communication method using both a communication terminal used for the camera to transmit information to the lens unit, and a communication terminal used for the camera to receive information from the lens unit.

8. A lens unit that is attachable to and detachable from a camera, the lens unit comprising:
a lens communication unit configured to communicate with the camera; and
a lens controller configured to control the lens communication unit,
wherein the lens communication unit is configured to change a voltage applied to a communication terminal used for a communication with the camera, and
wherein the lens communication unit is configured to communicate with the camera using one of a first communication mode and a second communication mode, the first communication mode enabling the communication with the camera using a communication method of a first communication speed, the second communication mode enabling the communication with the camera using a communication method of a second communication speed faster than the first communication speed, the first communication mode setting the voltage applied to the communication terminal to a first range, and the second communication mode setting the voltage applied to the communication terminal to a second range that is located on a lower voltage side than the first range.

9. The lens unit according to claim 8, wherein the lens communication unit changes a voltage range applied to the communication terminal in accordance with a signal received from the camera which instructs a change of the voltage applied to the communication terminal.

10. The lens unit according to claim 8, wherein data size communicated in the second communication mode is larger than data size communicated in the first communication mode.

11. The lens unit according to claim 8, wherein the lens communication unit communicates with the camera in accordance with the second communication mode in an initial communication between the camera and the lens unit.

12. The lens unit according to claim 8, wherein the communication is synchronous with a clock signal in the first communication mode and, the communication is asynchronous with the clock signal in the second communication mode.

13. The lens unit according to claim 8, wherein the communication terminal is a communication terminal used for the lens apparatus to transmit data to the camera.

14. The lens unit according to claim 8, further comprising an image-pickup optical system configured to form an optical image of an object, and data communicated in the second communication mode contains aberration correcting information of the image-pickup optical system.

15. The lens unit according to claim 8, wherein the lens communication unit executes a communication of the second communication mode using a differential communication method using both a communication terminal used for the camera to transmit information to the lens unit, and a communication terminal used for the camera to receive information from the lens unit.

16. An image-pickup system comprising a lens unit, and a camera to which the lens unit is detachably attached, the camera including a camera communication unit configured to communicate with the lens unit, and a camera controller configured to control the camera communication unit, the lens unit including a lens communication unit configured to communicate with the camera, and a lens controller configured to control the lens communication unit,
wherein the camera communication unit is configured to change a voltage applied to a first communication terminal used for a communication with the lens unit,
wherein the camera communication unit is configured to communicate with the lens unit using one of a first communication mode and a second communication mode, the first communication mode setting the voltage applied to the communication terminal to a first range and enabling the communication with the lens unit using a communication method of a first communication speed, and the second communication mode setting the voltage applied to the communication terminal to a second range that is located on a lower side than the first range and enabling the communication with the lens unit using a communication method of a second communication speed higher than the first communication speed,
wherein the lens communication unit is configured to change a voltage applied to a communication terminal used for a second communication with the camera, and
wherein the lens communication unit is configured to set the voltage applied to the second communication terminal to the first range, and the second communication mode sets the voltage applied to the communication terminal to the second range.

* * * * *